United States Patent
Ludtke et al.

(10) Patent No.: US 8,819,173 B2
(45) Date of Patent: *Aug. 26, 2014

(54) SYSTEM AND METHOD FOR EFFECTIVELY IMPLEMENTING AN ELECTRONIC IMAGE MANAGER DEVICE

(75) Inventors: Harold A. Ludtke, San Jose, CA (US); Steven G. Goldstein, Los Angeles, CA (US); David G. Longendyke, Vernon, NJ (US); Philip M. Abram, Warwick, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 330 days.

This patent is subject to a terminal disclaimer.

(21) Appl. No.: 13/345,857

(22) Filed: Jan. 9, 2012

(65) Prior Publication Data

US 2012/0158902 A1    Jun. 21, 2012

Related U.S. Application Data

(63) Continuation of application No. 12/928,645, filed on Dec. 16, 2010, now Pat. No. 8,131,819, and a continuation of application No. 09/794,677, filed on Feb. 27, 2001, now Pat. No. 7,882,199.

(60) Provisional application No. 60/187,136, filed on Mar. 6, 2000.

(51) Int. Cl.
*G06F 15/16* (2006.01)

(52) U.S. Cl.
USPC .................... 709/217; 709/212; 707/E17.02

(58) Field of Classification Search
USPC ............ 709/212–213, 217–219; 707/812, 707/E17.02

See application file for complete search history.

(56) References Cited

U.S. PATENT DOCUMENTS

| | | | | |
|---|---|---|---|---|
| 4,932,026 A * | 6/1990 | Dev et al. | | 370/400 |
| 5,051,835 A * | 9/1991 | Bruehl et al. | | 386/324 |
| 5,075,874 A * | 12/1991 | Steeves et al. | | 358/1.13 |
| 5,448,550 A * | 9/1995 | Mok et al. | | 720/718 |
| 5,522,067 A * | 5/1996 | Swire | | 382/128 |
| 5,706,097 A * | 1/1998 | Schelling et al. | | 358/296 |
| 5,734,915 A * | 3/1998 | Roewer | | 715/202 |
| 5,754,242 A * | 5/1998 | Ohkami | | 348/441 |
| 5,954,514 A * | 9/1999 | Haas et al. | | 434/317 |
| 5,995,936 A * | 11/1999 | Brais et al. | | 704/275 |
| 6,002,814 A * | 12/1999 | Chadez | | 382/303 |
| 6,012,083 A * | 1/2000 | Savitzky et al. | | 709/202 |
| 6,038,367 A * | 3/2000 | Abecassis | | 386/262 |
| 6,094,221 A * | 7/2000 | Andersion | | 348/231.6 |
| 6,119,033 A * | 9/2000 | Spigelman et al. | | 600/426 |
| 6,304,291 B1 * | 10/2001 | Silverbrook | | 348/187 |
| 6,319,199 B1 * | 11/2001 | Sheehan et al. | | 600/200 |
| 6,373,507 B1 * | 4/2002 | Camara et al. | | 715/825 |
| 6,529,526 B1 * | 3/2003 | Schneidewend | | 370/486 |
| 7,882,199 B2 * | 2/2011 | Ludtke et al. | | 709/217 |
| 8,402,116 B2 * | 3/2013 | Ma et al. | | 709/217 |
| 2003/0046239 A1 * | 3/2003 | Geilfuss et al. | | 705/51 |

* cited by examiner

*Primary Examiner* — Bharat N Barot
(74) *Attorney, Agent, or Firm* — Gregory J. Koerner; Redwood Patent Law

(57) ABSTRACT

A system and method for effectively implementing an electronic image manager device includes one or more input/output interfaces for bi-directionally communicating with various information sources to transfer content information that includes image data. The electronic image manager device also includes a memory device for archiving the content information, and an application program that manipulates the content information by performing various procedures such as downloading and uploading the content information, organizing and managing the content information, editing the content information, and displaying the content information.

33 Claims, 8 Drawing Sheets

SYSTEM AND METHOD FOR EFFECTIVELY IMPLEMENTING AN ELECTRONIC IMAGE MANAGER DEVICE

CROSS-REFERENCE TO RELATED APPLICATIONS

This application relates to, and claims priority in, U.S. Provisional Patent Application Ser. No. 60/187,136, entitled "Digital Shoe Box," filed on Mar. 6, 2000, and also relates to, and claims priority as a Continuation application in U.S. Non-Provisional patent application Ser. No. 09/794,677, entitled "System And Method For Effectively Implementing An Electronic Image Manager Device," filed on Feb. 27, 2001 now U.S. Pat. No. 7,882,199, and further also relates to, and claims priority as a Continuation Application in U.S. Non-Provisional patent application Ser. No. 12/928,645, entitled-"System And Method For Effectively Implementing An Electronic Image Manager Device," filed on Dec. 16, 2010 now U.S. Pat. No. 8,131,819. The foregoing related applications are commonly assigned, and are hereby incorporated by reference.

BACKGROUND SECTION

1. Field of the Invention

This invention relates generally to techniques for managing visual information, and relates more particularly to a system and method for effectively implementing an electronic image manager device.

2. Description of the Background Art

Implementing effective methods for managing visual information is a significant consideration for designers and manufacturers of contemporary electronic devices. However, effectively managing visual information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively stores, displays, and manipulates digital image data may benefit from an efficient implementation because of the large amount and complexity of the digital data involved.

Due to growing demands on system resources and substantially increasing data magnitudes, it is apparent that developing new techniques for managing visual information is a matter of concern for related electronic technologies. Therefore, for all the foregoing reasons, developing effective systems for managing visual information remains a significant consideration for designers, manufacturers, and users of contemporary electronic devices.

SUMMARY

In accordance with the present invention, a system and method are disclosed for effectively implementing an electronic image manager device. In one embodiment, the image manager preferably includes, but is not limited to, a central processing unit (CPU), a user interface, a memory device, a display, one or more input/output interfaces (I/O interfaces), and a sound module.

The CPU may be implemented to include any appropriate and compatible microprocessor device that preferably executes software instructions to thereby control and manage the operation of the image manager. The display preferably may include any effective type of display technology including a cathode-ray-tube monitor or a liquid-crystal display device. In certain embodiments, the display may be attached to an exterior surface of the image manager with a hinge mechanism to permit the display to be folded against the image manager when not in use.

The I/O interfaces preferably may include one or more input and/or output interfaces to bi-directionally communicate with various entities such as imaging devices, distributed computer networks (including the Internet), wireless communications devices, removable storage media devices, host computer devices, and printer devices. The image manager may utilize the I/O interfaces for any purpose, including the transfer of content information that includes various types of image data.

The memory device may be implemented to include any combination of desired storage devices, including, but not limited to, read-only memory (ROM), random-access memory (RAM), and various types of non-volatile memory, such as floppy disks or hard disks. The memory device may include mass storage capabilities for archiving various types of content information. The sound module preferably may include appropriate interfaces to support audio functionality for the image manager. For example, in certain embodiments, the sound module may include, but is not limited to, an audio processing module, a power amplifier, one or more speaker devices, and a microphone device.

The user interface preferably may include any effective means to allow a system user to communicate with image manager. For example, the user interface may include a keyboard device, a wireless remote control device, a speech-recognition module with corresponding microphone, a graphical user interface with touch-screen capability, or a selection button array mounted externally on the image manager.

The image manager may also comprise application software that preferably may include, but is not limited to, a download manager, an upload manager, an editing module, a data manager, and various other miscellaneous routines. The download manager preferably may coordinate the downloading and storing of various types of content information from any appropriate source. For example, a camera device may capture and store various images onto removable storage media, such as a memory stick. The download manager may then access the images on the removable storage media and archive the images as content information in the memory device.

The upload manager preferably may control the uploading of content information to various appropriate destinations. For example, the upload manager may provide content information to a host computer system or to a networked destination such as the Internet. The editing module may preferably control various editing procedures for editing content information. For example, the editing module may be utilized to insert various transitions between individual images that are stored as content information.

The data manager preferably may manage content information that is archived in the image manager. For example, the data manager may create and restructure content information into various directories and folders to effectively organize various images from the content information. The present invention thus provides an improved system and method for effectively implementing an electronic image manager device.

DETAILED DESCRIPTION

The present invention relates to an improvement in visual information management techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for effectively implementing an electronic image manager device, and preferably includes one or more input/output interfaces for bi-directionally communicating with various information sources to transfer content information that includes image data. The electronic image manager device also includes a memory device for archiving the content information, and an application program that manipulates the content information by performing various procedures such as downloading and uploading the content information, organizing and managing the content information, editing the content information, and displaying the content information.

Figure 1:
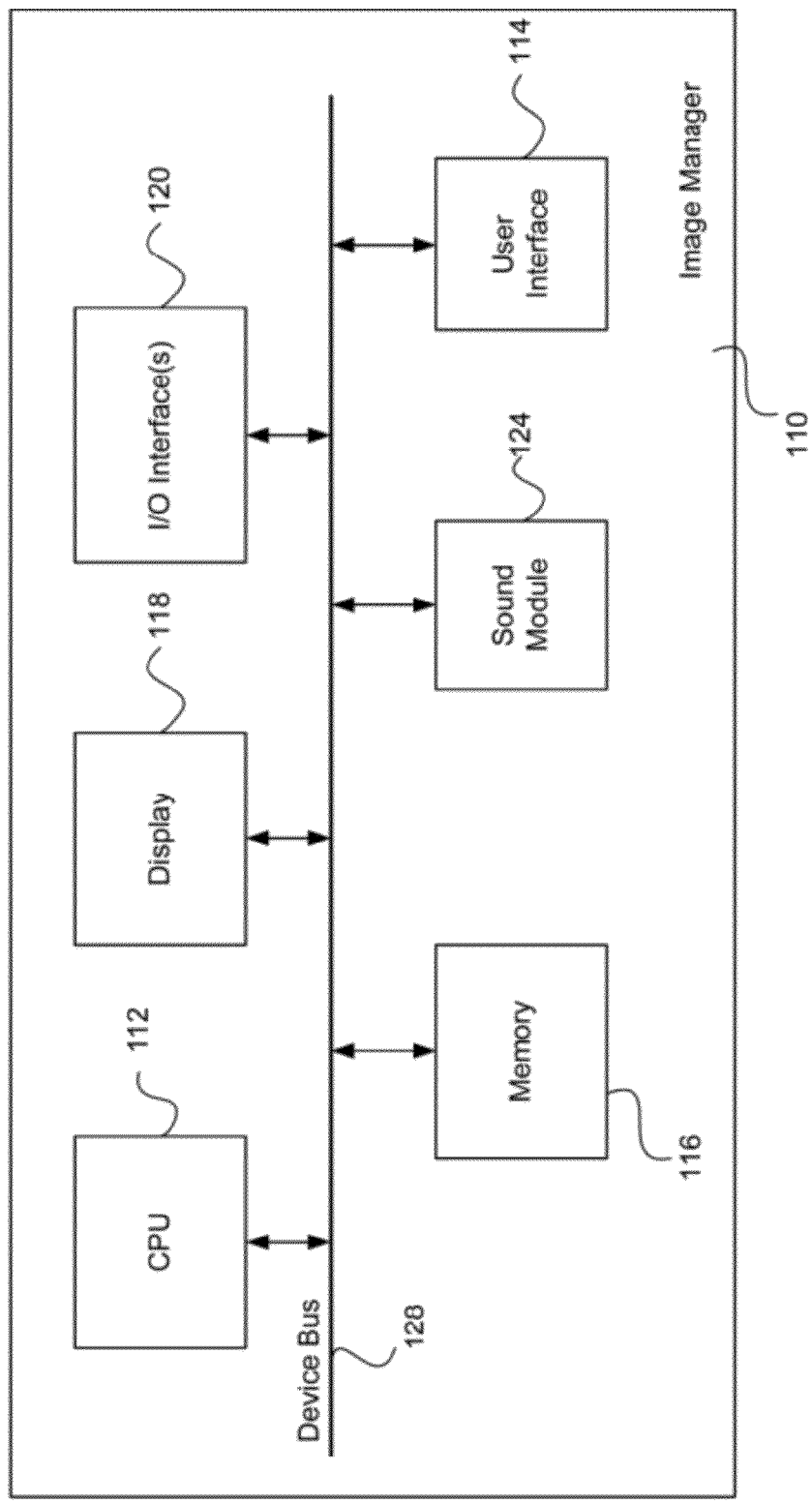
FIG. 1 is a block diagram for one embodiment of an electronic image manager device, in accordance with the present invention.

Referring now to FIG. 1, a block diagram for one embodiment of an electronic image manager device 110 is shown, in accordance with the present invention. In the FIG. 1 embodiment, image manager 110 preferably includes, but is not limited to, a central processing unit (CPU) 112, a user interface 114, memory 116, a display 118, input/output interface(s) (I/O interface(s)) 120, and a sound module 124. The foregoing components of image manager 110 may preferably be coupled to, and communicate through, a device bus 128. In alternate embodiments, image manager 110 may readily be implemented using various components and configurations in addition to, or instead of, those discussed in conjunction with the FIG. 1 embodiment.

In the FIG. 1 embodiment, CPU 112 may be implemented to include any appropriate and compatible microprocessor device that preferably executes software instructions to thereby control and manage the operation of image manager 110. The FIG. 1 display 118 preferably may include any effective type of display technology including a cathode-ray-tube monitor or a liquid-crystal display device. In certain embodiments, display 118 may be attached to an exterior surface of image manager 110 with a hinge mechanism to permit display 118 to be folded against image manager 110 when not in use, or during transport. Display 118 is further discussed below in conjunction with FIG. 6.

In the FIG. 1 embodiment, I/O interface(s) 120 preferably may include one or more input and/or output interfaces to receive and/or transmit any required types of relevant information by image manager 110. I/O interface(s) 120 are further discussed below in conjunction with FIG. 5. In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 and 3.

Sound module 124 preferably may include appropriate interfaces to support audio functionality for image manager 110. For example, in certain embodiments, sound module 124 may include, but is not limited to, an audio processing module, a power amplifier, one or more speaker devices, and a microphone device.

In the FIG. 1 embodiment, user interface 114 preferably may include any effective means to allow a system user to communicate with image manager 110. For example, user interface 114 may support a keyboard device, a wireless remote control device, a speech-recognition module with corresponding microphone, a graphical user interface with touch-screen capability, or a selection button array mounted externally on image manager 110. The functionality and operation of image manager 110 is further discussed below in conjunction with FIGS. 2 through 8.

Figure 2:
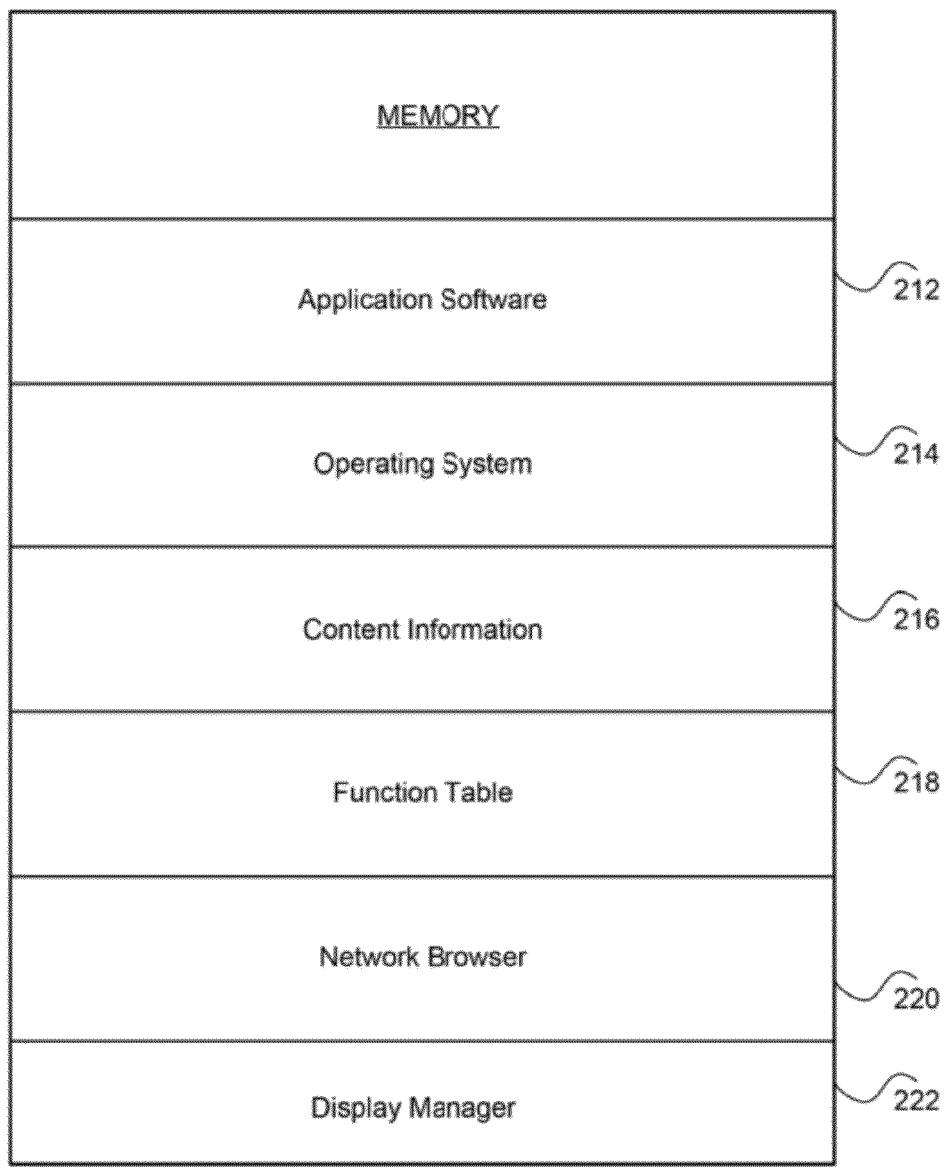
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 1 embodiment, memory 116 preferably includes, but is not limited to, application software 212, an operating system 214, content information 216, a function table 218, a network browser 220, and a display manager 222. In alternate embodiments, memory 116 may readily include various other components in addition to, or instead of, those components discussed in conjunction with the FIG. 2 embodiment.

In the FIG. 2 embodiment, application software 212 may include program instructions that are preferably executed by CPU 112 (FIG. 1) to perform various functions and operations for image manager 110. The particular nature and functionality of application software 212 preferably varies depending upon factors such as the specific type and particular use of the corresponding image manager 110. The configuration and functionality of application software 212 is further discussed below in conjunction with FIG. 3.

In the FIG. 2 embodiment, operating system 214 preferably controls and coordinates low-level functionality of image manager 110. Content information 216 preferably includes various types of data that is preferably archived in mass storage of memory 116. Content information 216 preferably may include various types of captured image data or other types of information. The structure and configuration of content information 216 is further discussed below in conjunction with FIG. 4. Function table 218 preferably includes user-programmable functions that image manager 110 may perform in response to analyzing an associated function identifier that may be embedded in downloaded content information 216.

In the FIG. 2 embodiment, network browser 220 preferably may control bi-directional communications between image manager 110 and a distributed computing network. For example, network browser 220 may include an Internet browser module to allow image manager 110 to download or upload information to or from the Internet. In certain embodiments, image manager 110 may function as a personal server for an Internet web page, or as an image source for providing content information 216 to another Internet web page. In addition, network browser 220 may support communications between image manager 110 and various devices, nodes, or functionalities of local area networks, such as a home network.

Display manager 222 preferably coordinates and controls the presentation of appropriate visual information on display 118 in response to instructions from application software 212. In certain embodiments, display manager 222 and associated hardware components support a high-resolution display output for presentation of content information 216.

Figure 3:
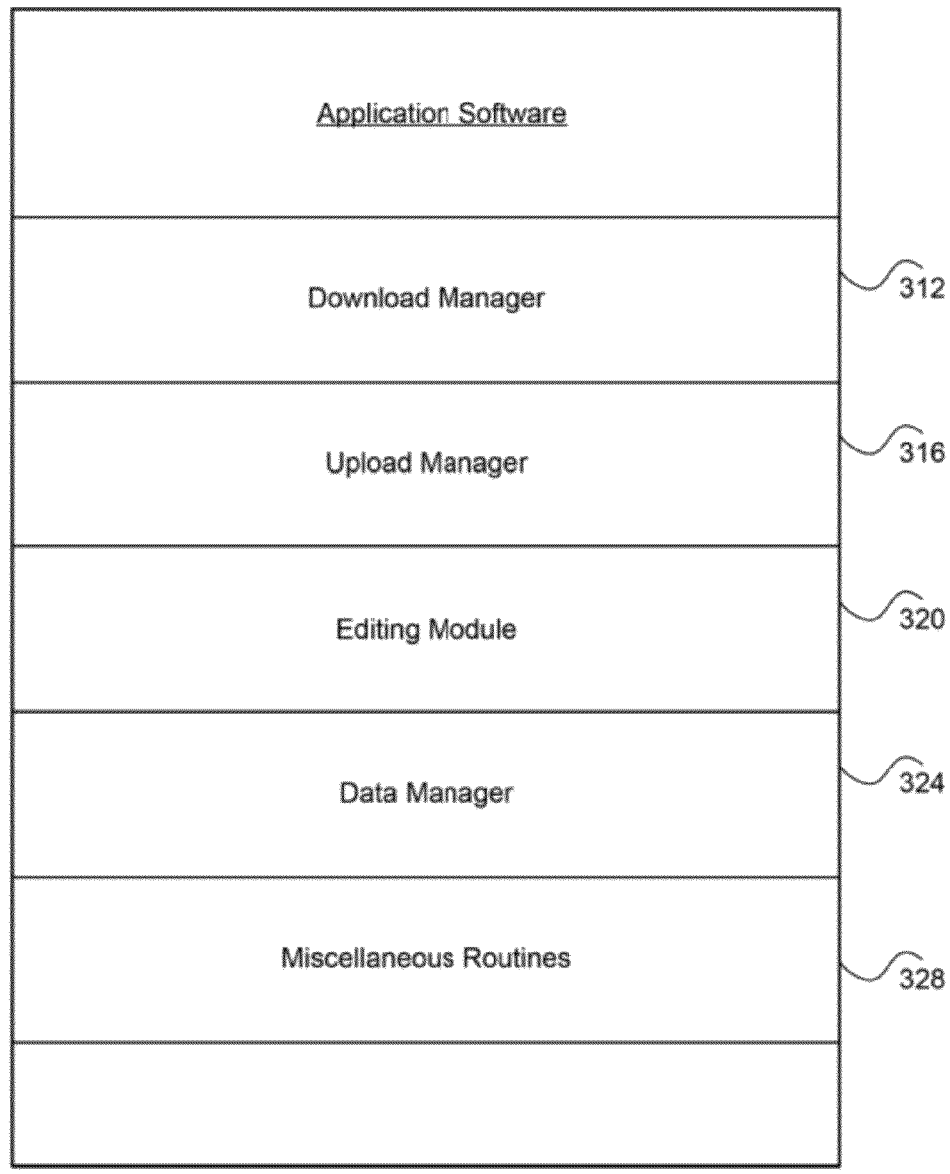
FIG. 3 is a block diagram for one embodiment of the application software of FIG. 2, in accordance with the present invention.

Referring now to FIG. 3, a block diagram for one embodiment of the FIG. 2 application software 212 is shown, in accordance with the present invention. In the FIG. 3 embodiment, application software 212 preferably may include, but is not limited to, a download manager 312, an upload manager 316, an editing module 320, a data manager 324, and miscellaneous routines 328. In alternate embodiments, application software 212 may readily include various other components in addition to, or instead of, those components discussed in conjunction with the FIG. 3 embodiment.

In the FIG. 3 embodiment, download manager 312 preferably may coordinate the downloading and storing of various types of content information 216 from any appropriate source. For example, a camera device may capture and store various images onto removable storage media. Download manager 312 may then access the images on the removable storage media and archive the images as content information 216 in memory 116.

Upload manager 316 preferably may control the uploading of content information 216 to various appropriate destinations. For example, upload manager 316 may provide content information 216 to a host computer system or to a networked destination such as the Internet. Editing module 320 may preferably control various editing procedures for editing content information 216. For example, editing module 320 may be utilized to insert various transitions between individual images stored as content information 216. Such transitions may include a fade transition or a wipe transition.

In the FIG. 3 embodiment, data manager 324 preferably may manage content information 216 that is archived in image manager 110. For example, data manager 324 may create and restructure content information 216 into various directories and folders to effectively organize various images in content information 216. Miscellaneous routines 328 may include any desired software instructions to facilitate functions performed by image manager 110. For example, miscellaneous routines 328 may include a data transformation routine that translates a downloaded format of content information 216 into an uploadable format of the same content information 216 that is compatible with a selected destination.

Figure 4:
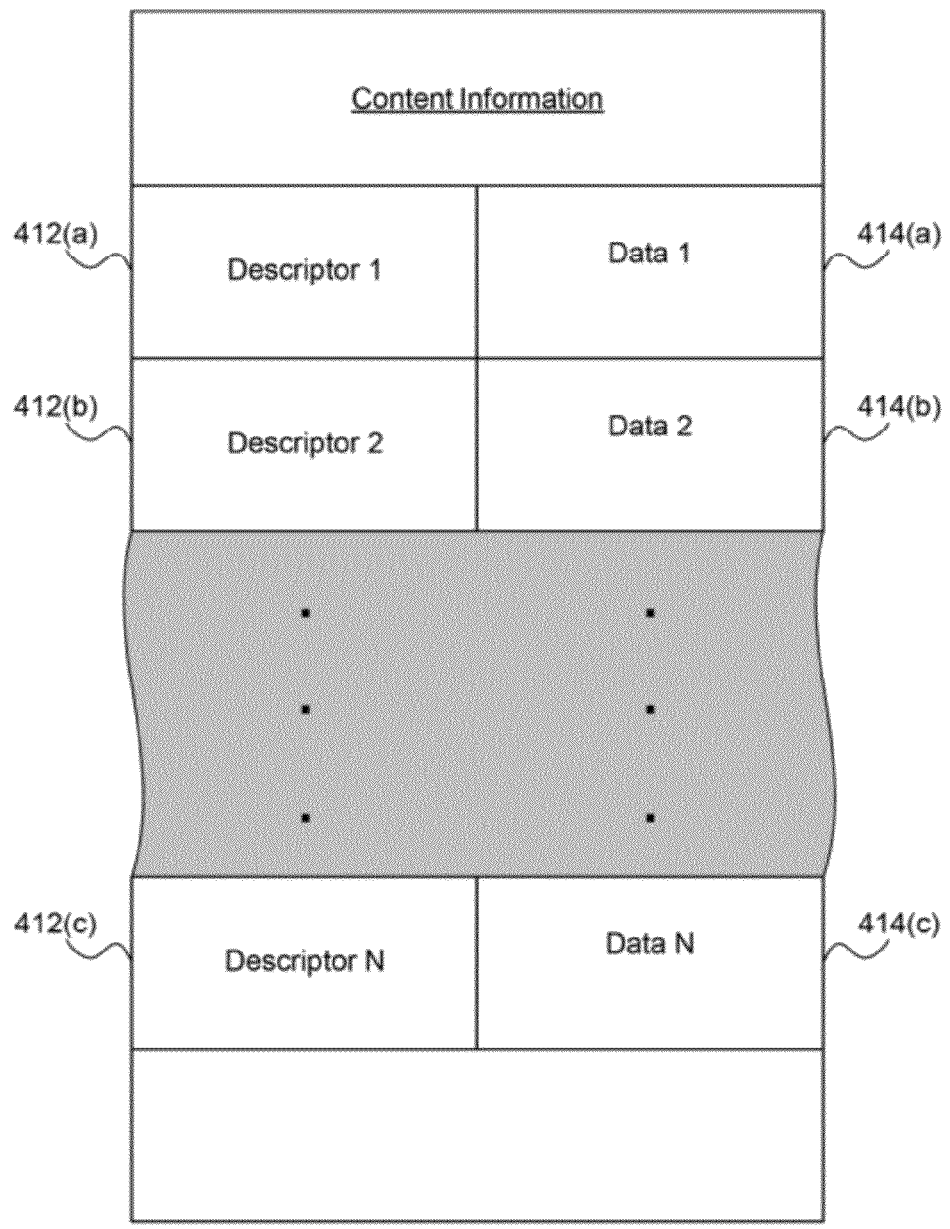
FIG. 4 is a block diagram for one embodiment of the content information of FIG. 2, in accordance with the present invention.

Referring now to FIG. 4, a block diagram for one embodiment of the FIG. 2 content information 216 is shown, in accordance with the present invention. In alternate embodiments of the present invention, content information 216 may readily be implemented to include various other configurations, and may also include various items and components that are different from those discussed in conjunction with the FIG. 4 embodiment.

In the FIG. 4 embodiment, content information 216 preferably may include individual sets of data 1 (414(*a*)) through data N (414(*c*)) that each preferably corresponds with a specific captured image or other type of archived information. In the FIG. 4 embodiment, content information 216 may include any desired type of information or other data that may be received from any information source. For example, content information 216 may include image data that is encoded in any format, audio data that is encoded in any format (such as data from a voice-note recorder or from a portable music player/recorder device), graphics data that is encoded in any format, text data that is encoded in any format, various types of information stored on a memory stick or other portable non-volatile medium, or any other type of electronically generated or electronically captured information.

In certain embodiments, when download manager 312 discovers a new data type during a download procedure, download manager 312 may contact a back-end service via any appropriate means (including the Internet) to download an appropriate editing module 320 for the new data type. Therefore, editing module 320 may readily include multiple different editing modules that each correspond to an associated data type.

In the FIG. 4 embodiment, content information 216 preferably also may include a descriptor 1 (412(*a*)) through a descriptor N (412(*c*)) that each is preferably associated with a different respective set of data 414. In alternate embodiments, content information 216 may be configured to include a single descriptor 412 that describes multiple sets of data 414.

In the FIG. 4 embodiment, descriptors 412 may include any appropriate information that is related to a corresponding set of data 414. For example, descriptor 412 may include information regarding the nature of the associated data 414, such as a data format or a data type. Descriptor 412 may also include information regarding how the associated data 414 is organized, such at a data structure or a data size. In certain embodiments, descriptor 412 may be encoded in a format for which unique decoding information may be accessed from an updateable source, such as the Internet, to thereby enable successful decoding of new versions of descriptors 412 or data 414.

In certain embodiments, descriptor 412 may be encoded in an special programming language, such as an extensible markup language (XML), that may be applied to a recording medium by a data capture device, such as a digital camera, and then read and responded to by image manager 110. Content information 216 preferably also may include a time stamp that is generated by an imaging device or camera to indicate precisely when a corresponding set of data 414 was captured. The foregoing time stamp may be stored in any effective location or manner, including in a corresponding descriptor 412 or set of data 414.

Figure 5:
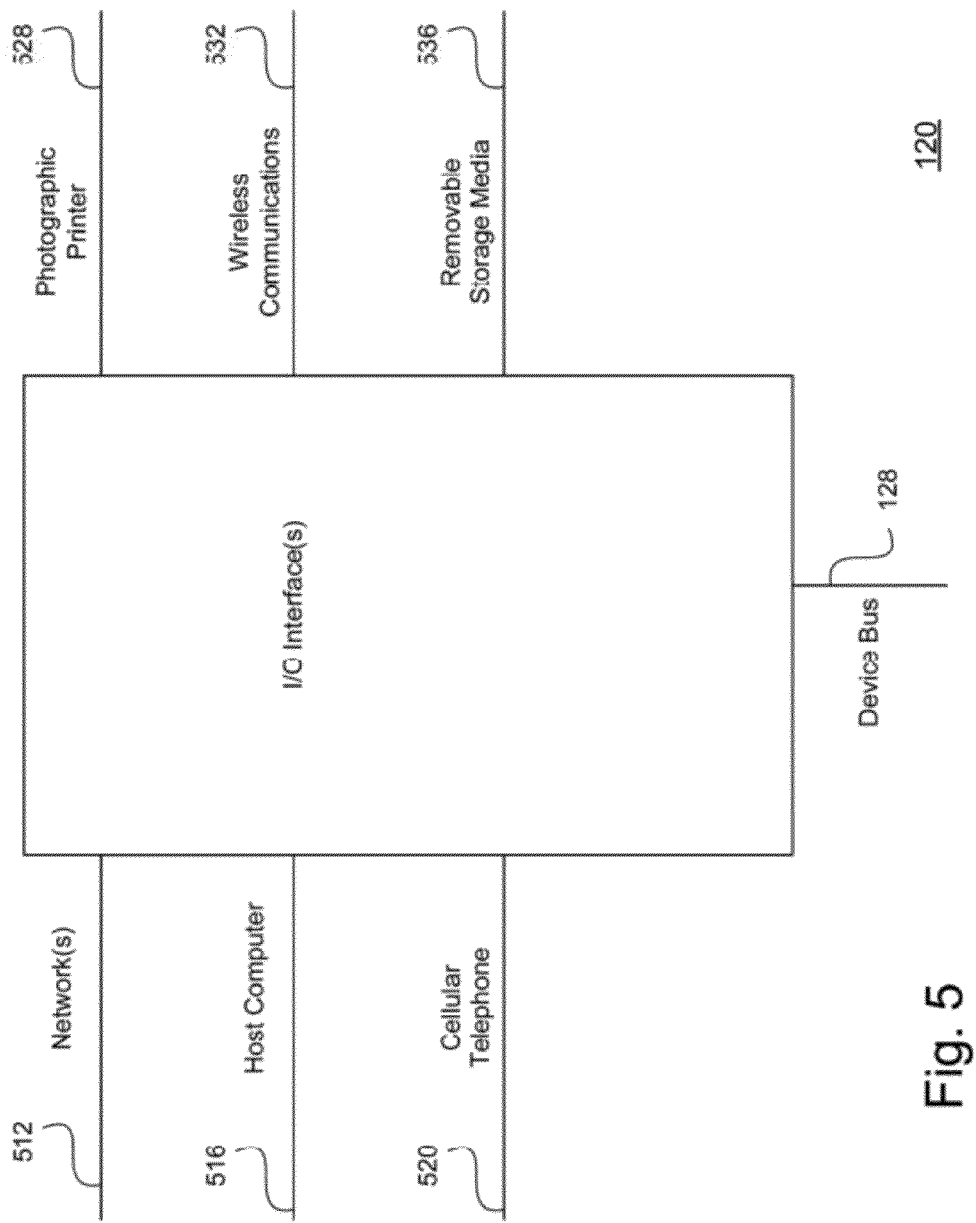
FIG. 5 is a block diagram for one embodiment of the I/O interface(s) of FIG. 1, in accordance with the present invention.

Referring now to FIG. 5, a block diagram for one embodiment of the FIG. 1 I/O interface(s) 120 is shown, in accordance with the present invention. In the FIG. 5 embodiment, I/O interface(s) 120 preferably may communicate with various input or output entities that may include, but are not limited to, network(s) 512, a host computer 516, a cellular telephone 520, a photographic printer 528, wireless communications 532, and removable storage media 536. I/O interface(s) 120 may preferably communicate with image manager 110 via device bus 128. In alternate embodiments, I/O interface(s) 120 may readily include various other elements and functionalities in addition to, or instead of, those discussed in conjunction with the FIG. 5 embodiment. In addition, I/O interface(s) 120 may be implemented and configured using any effective technology or method.

In the FIG. 5 embodiment, image manager 110 may utilize I/O interface(s) 120 to bi-directionally communicate with one or more network(s) 512. For example, image manager 110 may advantageously communicate with the Internet or other distributed computer networks to upload or download various types of content information 216.

Image manager 110 may also utilize I/O interface(s) 120 to bi-directionally communicate with a host computer 516. For example, image manager 110 may communicate with a personal computer device over a Universal Serial Bus (USB) to effectively upload or download various types of content information 216. The foregoing personal computer device may then be utilized to process, manipulate, and otherwise utilize the content information 216 from image manager 110. In the FIG. 5 embodiment, image manager 110 may utilize I/O interface(s) 120 to bi-directionally communicate with a cellular telephone 520 to preferably provide any desired information for enabling flexible functionality of image manager 110.

In the FIG. 5 embodiment, image manager 110 may also utilize I/O interface(s) 120 to bi-directionally communicate with various types of wireless communications 532. Wireless communications 532 preferably may include any effective means to remotely communicate with an external entity such as an Internet server, to thereby exchange relevant information for successful operation of image manager 110. In addition, image manager 110 may utilize wireless communications 532 to download various types of content information 216 and other data from a wireless source such as a digital camera device or a computer. In certain embodiments, wireless communications 532 may also receive various control information from a wireless remote control device. Wireless communications 532 may be implemented using any appropriate wireless technology, including radio-frequency transmission, infra-red transmission, or micro-wave transmission.

In the FIG. 5 embodiment, removable storage media 536 may preferably be utilized to receive or provide any desired information for facilitating the operation of image manager 110. For example, removable storage media 536 may provide means for bi-directional transfers of content information 216 between image manager 110 and other appropriate entities, such as a digital camera device. In certain embodiments, removable storage media 536 may include memory devices to support any desired type or combination of removable storage media. For example, removable storage media 536 may include memory sticks, flash memory devices, compact disks, mini-disks, or floppy disks.

In certain embodiments, image manager 110 may include I/O interfaces 120 supporting for a plurality of portable non-volatile memory devices that may preferably be implemented as memory stick devices or other similar devices. Image manager 110 may preferably also include a series of physical connectors to simultaneously accommodate and electrically couple any of the foregoing plurality of portable non-volatile memory devices to device bus 128 of image manager 110 to thereby support bi-directional electronic communications between any one of the plurality of non-volatile memory devices and image manager 110.

In addition to the various foregoing enumerated types of I/O interface(s) 120, image manager 110 preferably may also include any required types of interfaces or connectors (not shown) for coupling image manager 110 and other hardware devices to support bi-directional electronic communications.

Figure 6:
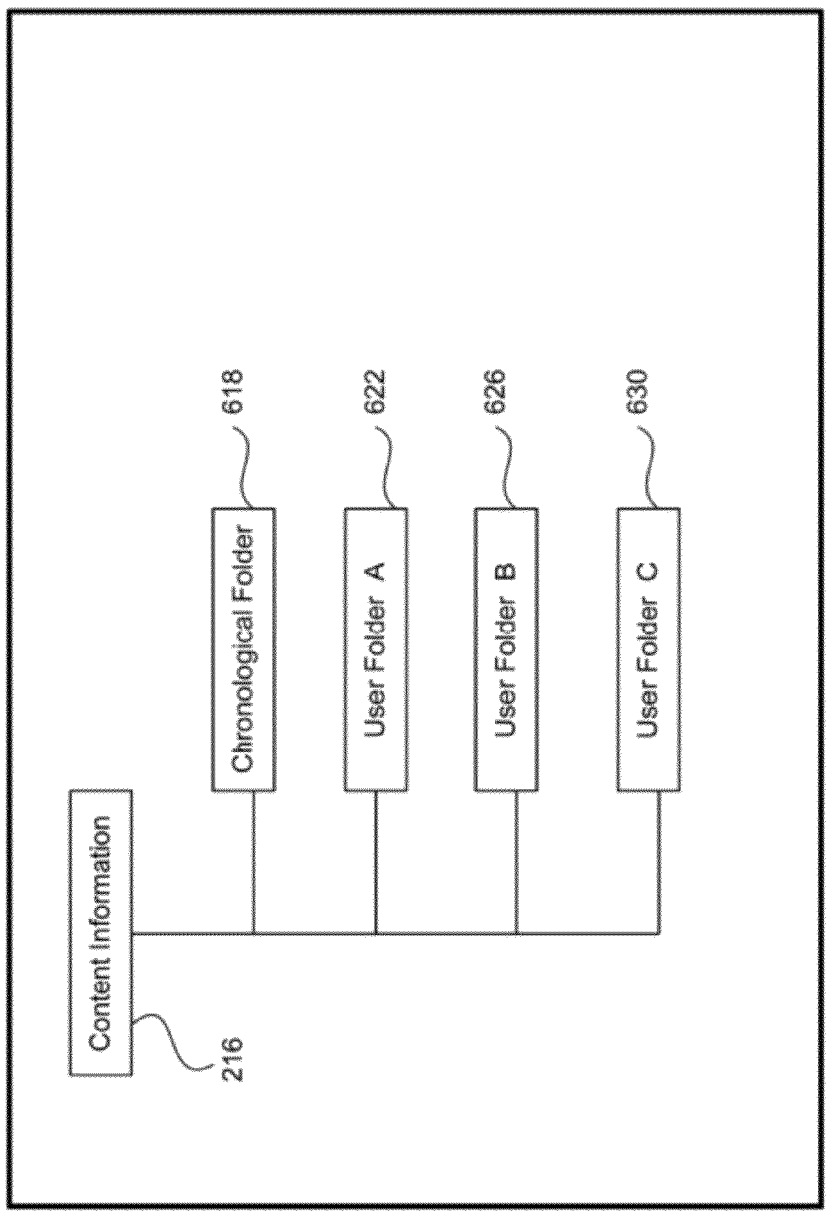
FIG. 6 is a block diagram for one embodiment of the display of FIG. 1, in accordance with the present invention.

Referring now to FIG. 6, a block diagram for one embodiment of the FIG. 1 display 118 is shown, in accordance with the present invention. In the FIG. 6 embodiment, display 118 preferably comprises, but is not limited to, a directory structure that includes content information 216, a chronological folder 618, a user folder A 618, a user folder B 626, and a user folder C 630. The FIG. 6 embodiment is presented for purposes of illustration, and in alternate embodiments, display 118 may readily include various other elements in addition to, or instead of, those discussed in conjunction with the FIG. 6 embodiment. For example, the FIG. 6 embodiment shows only three user folders, however, the present invention may readily support and utilize any desired number of folders or files that may be arranged in any desired type of directory structure.

In the FIG. 6 example, the directory structure shown on display 118 may include a representation for content information 216 that includes further representations for a chronological folder 618 and for user folders A through C (622 through 630). In accordance with one embodiment of the present invention, download manager 312 of image manager 110 may initially download various content information 216 into chronological folder 618, where download manager 312 may organize the downloaded content information 216 according to a time stamp that is associated with each image of the downloaded content information 216.

A system user may advantageously utilize data manager 324 to create and name any desired number of user folders. The system user may then subsequently utilize data manager 324 to further organize the contents of chronological folder 618 by selecting individual images and archiving the selected images into an appropriate user folder. In certain embodiments of the present invention, image manager 110 preferably may support a high-resolution output functionality for providing enhanced image quality for the display of content information 216 on display 118 or other appropriate display device.

Image manager 110 may also utilize data manager 324, editing module 320, upload manager 316, or miscellaneous routines 328 to further manipulate and utilize the downloaded content information 216. For example, image manager 110 may utilize data manager 324 to move content information 216 between various types of storage media, such memory 116 and various types of removable storage media 536 (such as multiple memory stick devices). Therefore, in contrast to the FIG. 6 embodiment, a displayed representation of content information 216 may be alternately organized into various types of storage media for presentation on display 118, instead of utilizing the foregoing directory structure shown in FIG. 6.

Figure 7:
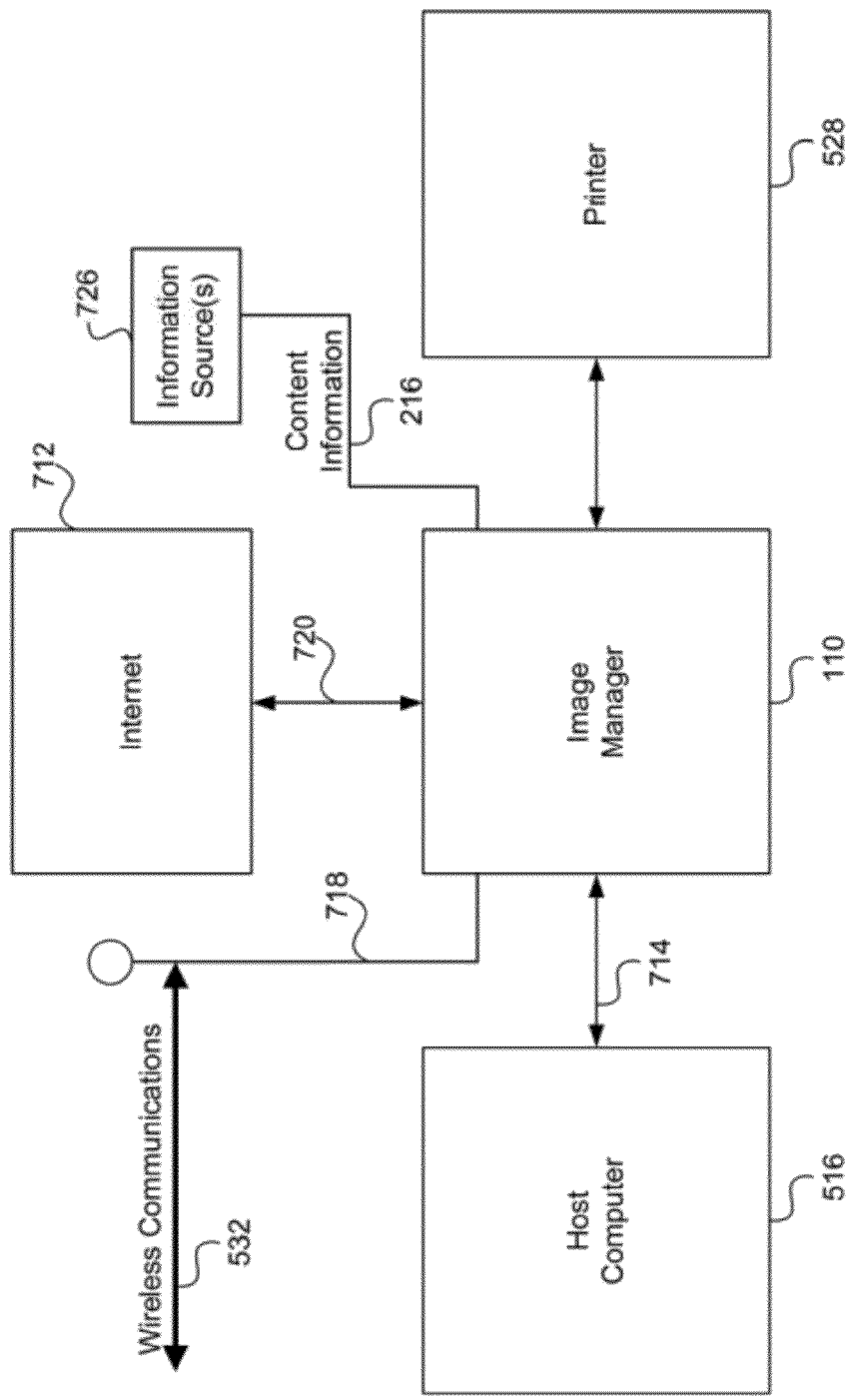
FIG. 7 is a block diagram of an electronic image manager system, in accordance with one embodiment of the present invention.

Referring now to FIG. 7, a block diagram of an electronic image manager system is shown, in accordance with one embodiment of the present invention. In the FIG. 7 embodiment, the electronic image manager system preferably includes, but is not limited to, an image manager 110, a printer 528, a host computer 516, the Internet 712, and wireless communications 532. The FIG. 7 embodiment is presented for purposes of illustration, and in alternate embodiments of the present invention, electronic image manager systems may readily include various other components or functionalities in addition to, or instead of, those discussed in conjunction with the FIG. 7 embodiment.

In the FIG. 7 embodiment, image manager 110 preferably may communication with the Internet 712 via path 720, and with host computer 516 via path 714. Image manager 110 may also receive and send various types of information by wireless communications 532 via antenna 718. Furthermore, image manager 110 is electrically coupled to a photographic printer 528 via path 716. Image manager 110 may thus readily produce hard copies of various images from content information 216 for use by a system user. In accordance with the present invention, image manager 110 may also preferably receive content information 216 from an imaging device (not shown) via various types of removable storage media.

In certain embodiments, image manager 110 or host computer 516 may format various types of removable storage media with appropriate directories for use by a compatible imaging device for organizing content information 216 into appropriate directories or user folders during the image capture process and prior to downloading the content information 216 to image manager 110.

In the FIG. 7 embodiment, image manager 110 may utilize removable memory media 536 that contains a user-programmable identifier that application software 312 may the associate with a given function on image manager 110 to thereby automatically perform the given function. For example, a system user may utilize network browser 220 to create and store one or more web page templates in image manager 110. Application software 212 may then identify a particular set of content information 216 by analyzing the user-programmable identifier in the removable storage media 536. Application program 212 may then automatically populate the appropriate web page template with images from the downloaded content information 216 to thereby produce a web page for display by network browser 220.

Figure 8:
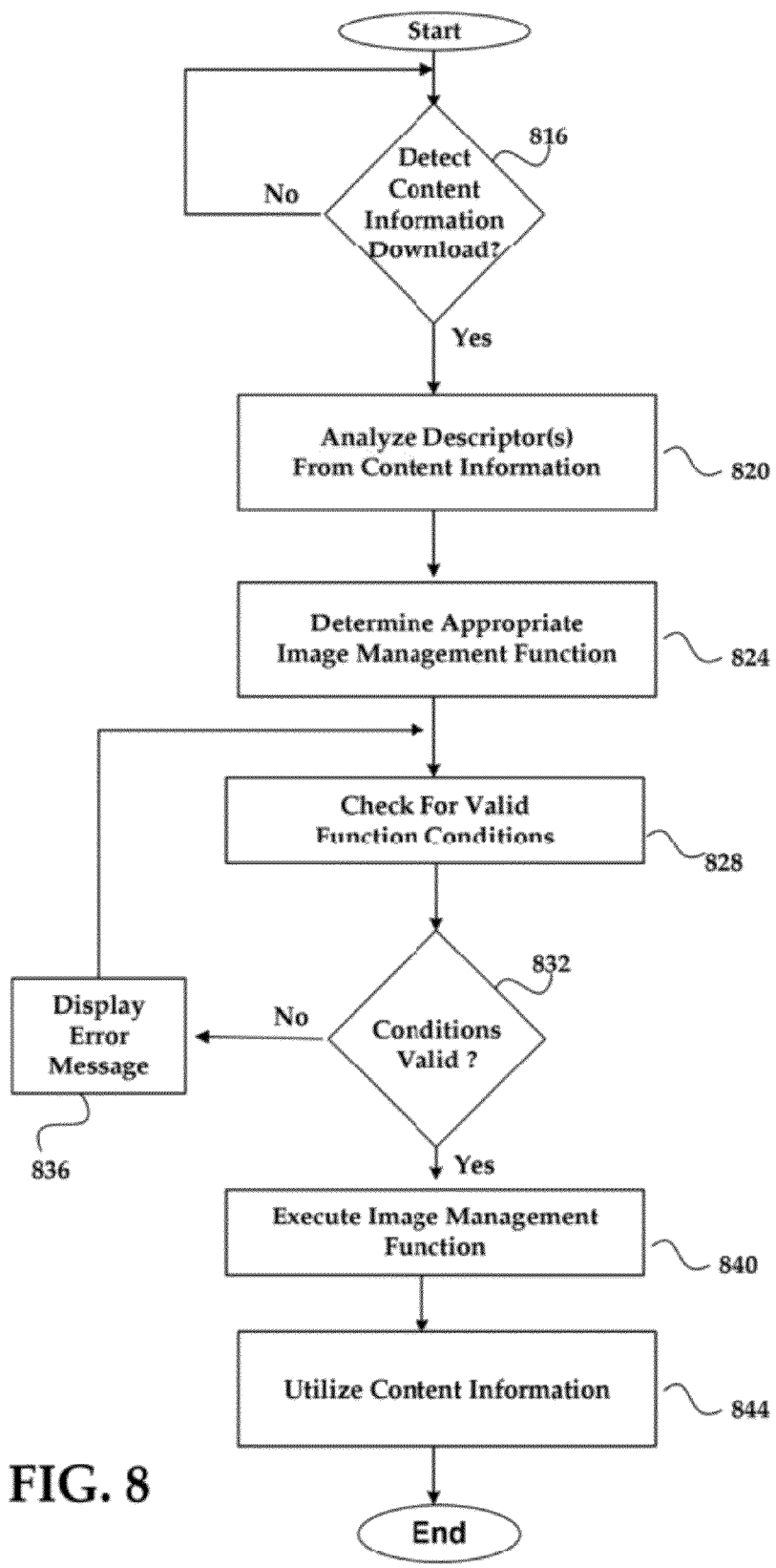
FIG. 8 is a flowchart of method steps for utilizing an electronic image manager device, in accordance with one embodiment of the present invention.

Referring now to FIG. 8, a flowchart of method steps for utilizing an electronic image manager device 110 is shown, in accordance with one embodiment of the present invention. The FIG. 8 example is presented for purposes of illustration, and, in alternate embodiments, the present invention may readily utilize various other steps and sequences than those discussed in conjunction with the FIG. 8 embodiment.

In the FIG. 8 embodiment, initially, in step 816, download manager 312 in application software 212 may preferably monitor image manager 110 to detect an information download of content information 216 from any appropriate download source. If download manager 312 detects an information download of content information 216, then, in step 820, download manager 312 may preferably analyze one or more descriptor(s) 412 from the downloaded content information 216 to identify relevant information regarding the content information 216, as discussed above in conjunction with FIG. 4.

In step 824, preferably as a result of analyzing descriptor(s) 412 in foregoing step 820, download manager 312 may preferably determine an appropriate image management function to perform with regard to the downloaded content information 216 using any appropriate means. For example, download manager 312 may analyze a unique function identifier that may be embedded in downloaded content information 216. Alternately, the function identifier may be included in descriptor(s) 412 or provided in any other appropriate manner as part of a download procedure of content information 216.

Image manager 110 may then responsively reference a function table 218 (FIG. 2) or other resources to thereby determine an appropriate responsive action to take with regard to the foregoing function identifier. In certain embodiments, function table 218 or other resources may preferably may include various selectable user-programmable functions that correspond to the foregoing function identifier. Image manager 110 may then automatically perform the designated image management function under the control of application software 212.

For example, in one embodiment, application software 212 may advantageously create and store one or more web page templates in memory 116 of image manager 110. Application software 212 may then automatically populate one or more of the web page templates with pre-identified images from said content information 216 in response to a user-programmable identifier from downloaded content information 216, as discussed above. Image manager 110 may then upload one or more of the web page templates with appropriate images for viewing an a distributed computer network like the Internet or a local area network.

In alternate embodiments, image manager 110 may manipulate the downloaded content information 216 in response to system user instructions that are entered manually through user interface 114 after referencing relevant download information that may be presented by application software 212 on display 118. In the FIG. 8 embodiment, one default function may include storing the downloaded content information 216 into memory 116. However, any other desired image management function is equally within the scope of the present invention.

Next, in steps 828 and 832, application software 212 preferably checks whether valid conditions currently exist for successful completion of the selected image management function. If valid conditions do not currently exist for successful completion of the selected image management function, then, in step 836, application software 212 preferably generates and displays an error message to inform a system user that valid conditions do not currently exist for performing the selected image management function. In certain embodiments, the error message may include specific information that identifies the nature of the error and potential remedies to correct the error. The error message function may time out after a pre-determined time period if invalid conditions persist.

In the FIG. 7 embodiment, if an invalid condition is discovered (such as download of an unsupported image type or appropriate functions are not locally available in image manager 110), then an XML-based descriptor 412 may be utilized to contact a back-end service (server) to provide appropriate updates, or inform a system user of newly-available functions. The system user may then choose any number of new functions, which may be downloaded and installed in image manager 110, or which may be accessed remotely. If an error condition still persists, then image manager 110 may display the foregoing error message.

In foregoing step 832, if valid conditions exist for successful completion of the selected image management function, then, in step 840, application software 212 may preferably execute the selected image management function. Finally, in step 844, a system user may then effectively utilize various functions and components of image manager 110 to advantageously manipulate and use the downloaded content information 216, in accordance with the present invention.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an image manager, comprising:
    an information source configured to generate content information that includes one or more descriptors that are user-programmable, said descriptors each including a data structure;
    a storage device coupled to said image manager for storing said content information; and
    application software stored in said storage device and configured to manage said content information in response to said one or more descriptors, said application software being executed by a processor device.

2. The system of claim 1 wherein said information source includes one of an imaging device, a digital camera, and a computer device.

3. The system of claim 1 wherein said content information includes one or more captured sets of image data.

4. The system of claim 1 wherein said content information includes content data and one or more descriptors.

5. The system of claim 4 wherein said descriptors each includes a data format, a data type, said data structure, and a data size.

6. The system of claim 4 wherein said descriptors are formatted in an extensible markup language (XML) format.

7. The system of claim 4 wherein said descriptors are applied to said content information by a content-capturing device.

8. The system of claim 1 wherein said image manager includes a central processing unit, a display, a memory, one or more input/output interfaces, and a user interface.

9. The system of claim 8 wherein said memory includes application software, an operating system, said content information, a network browser, and a display manager.

10. The system of claim 9 wherein said application software includes a download manager, an upload manager, an editing module, a data manager, and miscellaneous routines, said miscellaneous routines including a translation routine for converting a first content format into a second content format.

11. The system of claim 8 wherein said one or more input/output interfaces allow said image manager to bi-directionally communicate with at least one of an imaging device, a distributed computer network, a host computer, a cellular telephone, a photographic printer, a wireless communications device, one or more removable storage media devices, and an Internet network, to thereby transfer said content information.

12. The system of claim 8 wherein said image manager provides a high-resolution image signal to said display.

13. The system of claim 8 wherein said display includes a liquid-crystal display device that is hinged to fold against an exterior surface of said image manager when not in use.

14. The system of claim 8 wherein said user interface displays a directory structure that represents said content information, said directory structure including a chronological folder in which said content information is initially organized in a chronological sequence according to a time stamp embedded in each image of said content information, said directory structure also including one or more user folders into which a system user may selectively move and organize said content information from said chronological folder.

15. The system of claim 8 wherein said user interface organizes and displays said content information according to said content information being stored in one or more media locations that are each coupled to said image manager.

16. The system of claim 1 wherein a download manager from application software in said image manager detects an information download of content information from said information source by receiving at least one of new storage media and new content information.

17. The system of claim 16 wherein said download manager analyzes one or more descriptors associated with said content information.

18. The system of claim 17 wherein said application program determines an image management function for handling said content information.

19. The system of claim 18 wherein said application program determines said image management function by analyzing a user-programmable identifier in said content information, and then referencing a user-programmable function table in said image manager.

20. The system of claim 18 wherein said image manager downloads one or more additional content management functions from a web server based upon said one or more descriptors, said one or more descriptors being encoded in an extensible markup language (XML), a system user responsively choosing from said one or more additional content management functions.

21. The system of claim 18 wherein said application program checks to ensure that valid conditions currently exist for a successful performance of said image management function on said image manager.

22. The system of claim 21 wherein said application program displays an error message on said user interface when said valid conditions do not currently exist for said successful performance of said image management function on said image manager.

23. The system of claim 21 wherein said image manager executes said image management function when said valid conditions currently exist for said successful performance of said image management function.

24. The system of claim 21 wherein said image management function includes archiving said content information into a chronological folder in said storage device.

25. The system of claim 21 wherein said image management function includes at least one of copying and moving said content information to one or more different storage media.

26. The system of claim 24 wherein said image manager utilizes said content information by performing one of an editing procedure using an editing module, an upload procedure using an upload manager, an organization procedure using a data manager, and a display procedure using a display manager.

27. The system of claim 1 wherein said content information includes at least one of audio data, graphics data, and text data.

28. The system of claim 1 further comprising connection means for electrically coupling multiple memory stick devices to said image manager for downloading said content information.

29. The system of claim 1 further comprising one or more additional downloaded editing modules for manipulating various different data formats.

30. The system of claim 1 further comprising a network browser that is configured to allow said image manager to communicate with a distributed computer network, said distributed computer network including at least one of an Internet network and a local area network.

31. The system of claim 1 wherein said information source formats removable storage media with appropriate directories and folders for pre-organizing said content information before downloading said content information into said image manager, said image manager storing said content information from said appropriate directories and folders into corresponding internal directories and folders in said storage device, said content information including one or more images captured by a camera device.

32. The system of claim 1 wherein said application software creates and stores one or more web page templates, and then automatically populates said one or more web page templates with pre-identified images from said content information in response to a user-programmable identifier in said content information, said content information including one or more images captured by a camera device.

33. The system of claim wherein said content information includes a descriptor and data, said descriptor being encoded in a format for which unique decoding information may be accessed from an updateable source to enable successful decoding of new versions of said descriptor or said data, said content information including one or more images captured by a camera device.

* * * * *